UNITED STATES PATENT OFFICE.

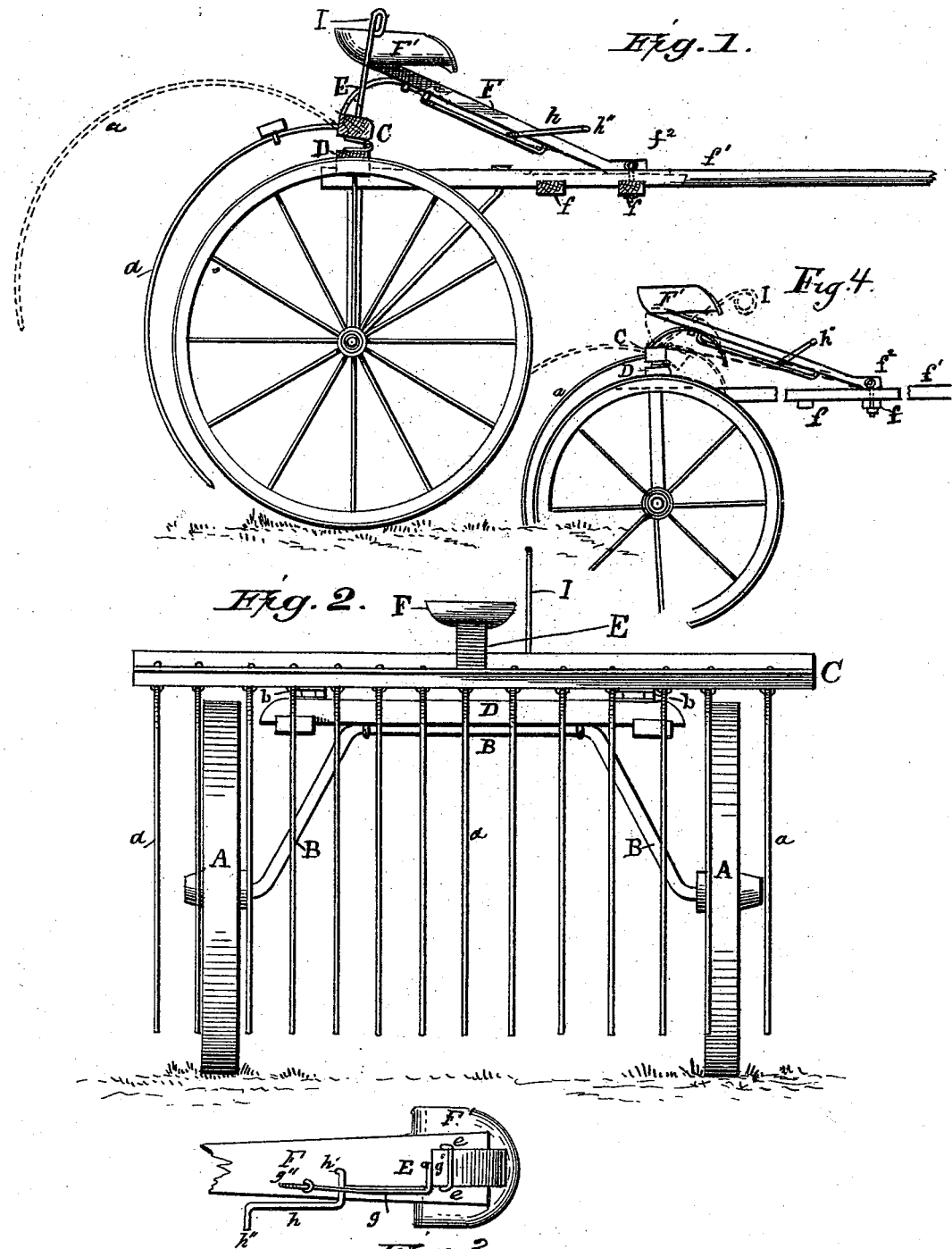

FRANCIS L. OSBORN, OF WINDSOR, NEW YORK.

HORSE HAY-RAKE.

SPECIFICATION forming part of Letters Patent No. 494,381, dated March 28, 1893.

Application filed October 25, 1892. Serial No. 449,972. (No model.)

*To all whom it may concern:*

Be it known that I, FRANCIS L. OSBORN, a citizen of the United States, residing at Windsor, in the county of Broome and State of New York, have invented certain new and useful Improvements in Horse Hay-Rakes; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain improvements in horse hay rakes, which will be hereinafter more particularly described and pointed out.

In the accompanying drawings forming part of this specification: Figure 1 is a side elevation of the rake. Fig. 2 is a rear end view of Fig. 1. Fig. 3 is a detail of the under side of the seat. Fig. 4 is a detail showing the driver's seat in upper and lower positions.

The special object of this improvement is to effect the dumping of the hay as it is gathered by the rake by means of the weight of the driver on the seat.

The wheels, A, and axle, B, are constructed as usual, the axle being bowed in the middle part. The rake head, C, in which the rake teeth, a a, &c., are secured, is hinged to the bolster, D, which is supported immediately above the axle, B. In the middle, on top of the frame, C, in which the teeth are secured, is a curved, flat bow, E, which passes through a loop, e, secured to the under side of the bar, F, to which the seat, F', is secured, which bar, F, is fastened at its lower end to the plate $f''$ which is properly secured to the cross back bars, $f f$, of the shafts, $f'$. The lower end of the bar F, which supports the seat, is connected to the plate $f''$ by a flexible joint as shown in Fig. 4—so that it can bend downwardly by the weight of the driver—when the end $g'$ of the spring rod $g$ is detached from the end of the bow E which will be hereinafter described.

The bow, E, passes loosely through the loop, e, and its end is stopped by the turned end, $g'$, of a spring rod, $g$, secured to the seat bar, F, at $g''$.

h is a lever, the ends being bent in opposite directions. The end, $h''$, is for the foot of the driver, and $h'$ is fastened to the bar, F. The lever, h, bears against the spring rod, $g$, so that, when the foot of the driver presses downward, the end, $g'$, of the rod, $g$, is forced down from the front of bow, E, and the bow, E, by the weight of the driver on the seat, is forced under the seat, and consequently the rake teeth with the hay is raised up as in dotted lines in Fig. 4.

By means of the handle, I, which projects above the rake frame, C, the driver can lower the rake head, C, and teeth, a, to the position shown in solid lines in Fig. 1.

I claim—

1. In a horse hay rake, the rake head C,—hinged to the bolster D immediately above the axle and having the curved bow E in combination with the seat F' supported on a yielding bar F, substantially as and for the purpose described.

2. In a horse hay rake, the combination of the seat F' and yielding seat bar F the rods $g$, and $h$, the bow E and rake head C with the teeth a all as and for the purpose described.

In testimony whereof I affix my signature in presence of two witnesses.

FRANCIS L. OSBORN.

Witnesses:
 WILLIAM POWERS,
 ROBERT H. RAY.